(12) United States Patent
Vella-Coleiro

(10) Patent No.: US 7,248,642 B1
(45) Date of Patent: Jul. 24, 2007

(54) FREQUENCY-DEPENDENT PHASE PRE-DISTORTION FOR REDUCING SPURIOUS EMISSIONS IN COMMUNICATION NETWORKS

(75) Inventor: George P. Vella-Coleiro, Summit, NJ (US)

(73) Assignee: Andrew Corporation, Westchester, IL (US)

( * ) Notice: Subject to any disclaimer, the term of this patent is extended or adjusted under 35 U.S.C. 154(b) by 790 days.

(21) Appl. No.: 10/068,343

(22) Filed: Feb. 5, 2002

(51) Int. Cl.
*H04L 25/49* (2006.01)

(52) U.S. Cl. ...................................... 375/296
(58) Field of Classification Search ............... 375/295, 375/296, 377; 455/114.3, 114.2, 91
See application file for complete search history.

(56) References Cited

U.S. PATENT DOCUMENTS

| | | | |
|---|---|---|---|
| 4,870,371 A | 9/1989 | Gottwald et al. | |
| 4,890,300 A * | 12/1989 | Andrews | 375/297 |
| 5,132,639 A | 7/1992 | Blauvelt et al. | 330/149 |
| 5,187,719 A | 2/1993 | Birgenheier et al. | 375/10 |
| 5,361,156 A | 11/1994 | Pidgeon | 359/161 |
| 5,872,814 A | 2/1999 | McMeekin | 375/296 |
| 5,937,011 A | 8/1999 | Carney et al. | 375/297 |
| 6,075,411 A | 6/2000 | Briffa et al. | 330/149 |
| 6,081,158 A | 6/2000 | Twitchell et al. | 330/149 |
| 6,091,941 A * | 7/2000 | Moriyama et al. | 455/126 |
| 6,112,062 A | 8/2000 | Hans et al. | |
| 6,141,390 A | 10/2000 | Cova | 375/297 |
| 6,166,603 A | 12/2000 | Smith | 330/263 |
| 6,194,942 B1 | 2/2001 | Yu et al. | 327/317 |
| 6,236,267 B1 | 5/2001 | Anzil | 330/149 |
| 6,271,724 B1 | 8/2001 | Neffling | 330/149 |

(Continued)

FOREIGN PATENT DOCUMENTS

EP    0 416 622 A2    3/1991

(Continued)

OTHER PUBLICATIONS

"A simplex method for function minimization", by J.A. Neider and R. Mead, Computer Journal, vol. 7 (1965), pp. 308-313.

(Continued)

*Primary Examiner*—Pankaj Kumar
(74) *Attorney, Agent, or Firm*—Steve Mendelsohn

(57) ABSTRACT

A frequency-dependent phase pre-distortion technique is applied to an input signal in order to reduce spurious emissions resulting from subsequent amplification of the signal. In preferred embodiments, the frequency-dependent phase pre-distortion of the present invention is implemented in combination with the (frequency-independent) magnitude and phase pre-distortion technique described in U.S. patent application Ser. No. 09/395,490 ("the '490 application"), where one or more frequency-dependent phase pre-distortion signals are either advanced or delayed relative to the main pre-distorted signal generated in accordance with the '490 application. Each frequency-dependent phase pre-distortion signal is preferably based on a 180° phase difference between a pair of (critical) frequencies located outside (e.g., one on each side) of the signal channel. The magnitude of the frequency difference between the pair of critical frequencies dictates the magnitude of the desired advancement or delay in time of the frequency-dependent pre-distortion signal relative to the main pre-distorted signal. Embodiments of the present invention may be implemented in either the baseband domain or the RF domain. Implementations may also be based on look-up tables that are adaptively updated to ensure optimal performance over time.

31 Claims, 12 Drawing Sheets

U.S. PATENT DOCUMENTS

| | | | |
|---|---|---|---|
| 6,275,103 B1 | 8/2001 | Maniwa | 330/149 |
| 6,281,747 B2 | 8/2001 | Ahuja et al. | 330/109 |
| 6,288,610 B1 | 9/2001 | Miyashita | 330/149 |
| 6,288,814 B1* | 9/2001 | Blauvelt | 398/193 |
| 6,304,140 B1 | 10/2001 | Thron et al. | 330/149 |
| 6,342,810 B1 | 1/2002 | Wright et al. | 330/51 |
| 6,366,177 B1 | 4/2002 | McCune et al. | 330/103 |
| 6,373,902 B1 | 4/2002 | Park et al. | 375/296 |
| 6,400,415 B1* | 6/2002 | Danielsons | 348/608 |
| 6,417,731 B1 | 7/2002 | Funada et al. | 330/149 |
| 6,429,736 B1 | 8/2002 | Parry et al. | 330/2 |
| 6,438,186 B1* | 8/2002 | Strait | 375/354 |
| 6,489,846 B2 | 12/2002 | Hatsugai | 330/149 |
| 6,512,417 B2 | 1/2003 | Booth et al. | 330/149 |
| 6,587,514 B1 | 7/2003 | Wright et al. | |
| 6,654,591 B1* | 11/2003 | Hoffmann | 375/297 |
| 6,677,820 B2 | 1/2004 | Miyatani | 330/149 |
| 6,683,495 B2 | 1/2004 | Johnson et al. | 330/52 |
| 6,687,511 B2 | 2/2004 | McGowan et al. | 455/522 |
| 6,700,442 B2 | 3/2004 | Ha | 330/124 R |
| 6,794,936 B2* | 9/2004 | Hsu et al. | 330/149 |
| 6,798,843 B1 | 9/2004 | Wright et al. | 375/296 |
| 6,885,709 B1 | 4/2005 | Dartois | 375/297 |
| 6,903,604 B2* | 6/2005 | Kim | 330/2 |
| 6,925,106 B2 | 8/2005 | Horaguchi et al. | 375/146 |
| 6,975,687 B2 | 12/2005 | Jackson et al. | 375/297 |
| 2001/0033238 A1 | 10/2001 | Velazquez | |
| 2002/0041210 A1 | 4/2002 | Booth et al. | 330/149 |
| 2002/0060606 A1 | 5/2002 | Andre | 330/149 |
| 2002/0065048 A1 | 5/2002 | Nagatani et al. | 455/63 |
| 2002/0080891 A1 | 6/2002 | Ahn et al. | 375/297 |
| 2002/0085647 A1 | 7/2002 | Oishi et al. | 375/297 |
| 2002/0125947 A1 | 9/2002 | Ren | 330/149 |
| 2002/0171485 A1 | 11/2002 | Cova | 330/149 |
| 2002/0186783 A1 | 12/2002 | Opas et al. | 375/297 |
| 2003/0016741 A1 | 1/2003 | Sasson et al. | 375/229 |
| 2003/0020538 A1 | 1/2003 | Kim | 330/2 |
| 2003/0045264 A1 | 3/2003 | Jeong et al. | 455/323 |
| 2003/0058960 A1 | 3/2003 | Lee | 375/297 |
| 2003/0076894 A1 | 4/2003 | Jin et al. | 375/296 |
| 2003/0076896 A1 | 4/2003 | Ball et al. | 375/297 |
| 2003/0117215 A1 | 6/2003 | O'Flaherty et al. | 330/149 |
| 2004/0041628 A1 | 3/2004 | Okubo et al. | 330/149 |
| 2004/0122627 A1 | 6/2004 | Kybett et al. | 702/189 |
| 2005/0088230 A1 | 4/2005 | Johnson et al. | 330/149 |

FOREIGN PATENT DOCUMENTS

| | | |
|---|---|---|
| EP | 1 085 668 A2 | 3/2001 |
| EP | 1 199 797 A1 | 4/2002 |
| EP | 1 280 273 A2 | 1/2003 |
| EP | 1 463 198 A2 | 9/2004 |
| GB | 2 348 755 A | 10/2000 |
| GB | 2 384 377 A | 7/2003 |
| WO | WO 03/085822 A1 | 10/2003 |

OTHER PUBLICATIONS

"An Efficient Adaptive Predistorter for Nonlinear High Power Amplifier in Satellite Communication", by Kang H.W. et al., 1997 International Symposium on Ciruits and Systems, Jun. 9-12, 1997, pp. 228-2291, XP-0000804798, New York.

"Communication Systems—Third Edition", by Carlson A.B., 1986, McGraw-Hill, Singapore XP-002245318; pp. 194-200. Bandpass System and Signals.

* cited by examiner

US 7,248,642 B1

FREQUENCY-DEPENDENT PHASE PRE-DISTORTION FOR REDUCING SPURIOUS EMISSIONS IN COMMUNICATION NETWORKS

BACKGROUND OF THE INVENTION

1. Field of the Invention

The present invention relates to signal processing, and, in particular, to the pre-distortion of signals for transmission, for example, in a wireless communication network, to reduce spurious emissions.

2. Cross-Reference to Related Applications

The subject matter of this application is related to the subject matter of U.S. patent application Ser. No. 09/395,490, filed on Sep. 14, 1999 ("the '490 application"), the teachings of which are incorporated herein by reference.

3. Description of the Related Art

Modern wireless communication networks employ complex modulation schemes that necessitate tight control of spurious emissions (sometimes called "out-of-band emissions") in order to avoid interfering with neighboring carriers and to comply with the requirements of regulatory bodies (e.g., FCC) and standards bodies (e.g. ITU). One source of spurious emissions is the base station transmitter amplifier that is used to amplify signals prior to transmission as wireless (e.g., RF) signals to wireless (e.g., mobile) units in a wireless communication network, such as a cellular voice and/or data network. Prior art techniques for reducing such spurious emissions were able to satisfy previous requirements. However, recent developments in wireless communication networks (e.g., Universal Mobile Telecommunication Service (UMTS)) place additional burden on the base station transmitter amplifier and make it advantageous to reduce the spurious emissions even further.

SUMMARY OF THE INVENTION

Embodiments of the present invention are directed to techniques that reduce spurious emissions in wireless communication networks to levels that satisfy current requirements. In particular, embodiments of the present invention involve the application of frequency-dependent phase pre-distortion to an input signal to generate a pre-distorted signal that, when applied to an amplifier, results in lower spurious emissions in the resulting amplified signal.

In one embodiment, the present invention is a method for reducing spurious emissions in an amplified signal, comprising the steps of (a) receiving an input signal; and (b) applying frequency-dependent phase pre-distortion to the input signal to generate a pre-distorted output signal, such that, when the pre-distorted output signal is applied to an amplifier to generate the amplified signal, the frequency-dependent phase pre-distortion reduces spurious emissions in the amplified signal.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

The '490 application describes a technique for reducing spurious emissions using digital pre-distortion that was sufficient to meet previously existing regulations and standards. According to the '490 application, frequency-independent magnitude and phase pre-distortion is applied to an input signal to generate a pre-distorted signal that reduces spurious emissions when the pre-distorted signal is subsequently amplified by an amplifier. According to embodiments of the present invention, frequency-dependent phase pre-distortion is applied to generate one or more additional pre-distortion signals that, when combined with the main pre-distorted signal described in the '490 application, can further reduce spurious emissions in the amplified signal. The following section provides a description of the pre-distortion technique taught in the '490 application. Following that is a description of the present invention, which is preferably combined with—but does not necessarily have to be combined with—the pre-distortion technique of the '490 application to further reduce spurious emissions in communications networks.

Pre-Distortion Technique of the '490 Application

The pre-distortion technique described in the '490 application reduces adjacent channel power in wireless communication networks. In particular, the '490 application describes a technique for digitally and adaptively pre-distorting an outgoing signal that involves applying a correction to the signal before it is applied, e.g., to the input of a base station transmitter amplifier, such that the correction is equal and opposite to at least some of the anticipated distortion produced by the amplifier. The correction causes at least some of the amplifier distortion to be canceled, resulting in a base station transmitter having a more linear transfer characteristic than a corresponding transmitter without such pre-distortion. In these circumstances, the adjacent channel power (i.e., spurious emission) is desirably reduced.

Figure 1:
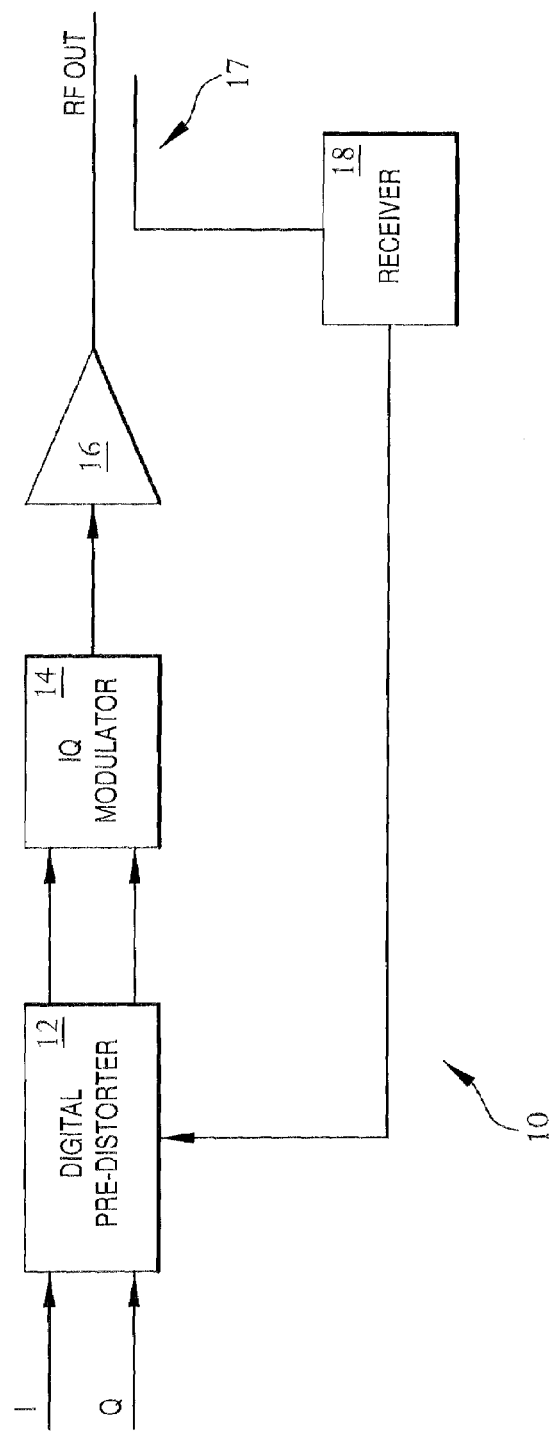
FIG. 1 shows a block diagram of a system, in accordance with the (frequency-independent) pre-distortion technique described in the U.S. application Ser. No. 09/395,490.

FIG. 1 shows a block diagram of a system 10, in accordance with the pre-distortion technique described in the '490 application. System 10 includes a digital pre-distorter 12 for receiving the in-phase (I) and quadrature (Q) components of an input digital baseband signal, an IQ modulator 14 connected to the output of pre-distorter 12, an amplifier 16 connected to the output of modulator 14, and a receiver 18 that is coupled to the output of amplifier 16 through a coupler 17 in order to generate a control signal that is fed back to pre-distorter 12. These components are configured to apply a correction to the input digital baseband signal (e.g., a code division multiple access (CDMA) signal, a wideband CDMA signal, a time division multiple access (TDMA) signal, an enhanced data rates through global system for mobile communications evolution (EDGE) signal, or other signal, preferably with a substantially large peak power to average power ratio) generated by a communication device—such as a base station used for transmitting wireless communication data—and applied to pre-distorter 12 as the input signal (I, Q). System 10 also provides adaptive feedback through receiver 18 to optimize the correction.

More specifically, this pre-distortion technique comprises applying a correction to a digital baseband signal before the signal is applied to an input of amplifier 16 such that the correction is opposite to at least a portion of the distortion produced by amplifier 16. Thus, the correction and some portion of the amplifier distortion cancel one another, resulting in a system with a more linear transfer characteristic. In system 10, in order to take advantage of the precision and low cost of digital circuits, digital pre-distorter 12 preferably performs its correction at baseband, before the signal is converted by modulator 14 to radio frequency (RF) for amplification and transmission.

According to this pre-distortion technique, pre-distorter 12 pre-distorts both the magnitude and the phase of the input signal as a function of the signal power (but independent of frequency). Since both the magnitude and phase corrections vary with the instantaneous power (i.e., envelope power), pre-distorter 12 relies on accurate descriptions of the amplifier magnitude and phase variations with power level to perform its function. As will be described below, the functional representation of the corrections (versus power level) are in the form of polynomial equations from which a look-up table is preferably derived.

More particularly, the digital baseband signal is comprised of discrete time samples of in-phase (I) and quadrature (Q) components which, after digital-to-analog conversion (not shown), are applied to the vector IQ modulator 14 to generate an RF signal that is then input to amplifier 16. Each sample for the baseband signal can be represented in complex number notation as (I+jQ), where j is the square root of (−1). The pre-distortion operation of pre-distorter 12 can be represented according to Equations (1)-(3) as follows:

$$I'+jQ'=(I+jQ)(A+jB) \quad (1)$$

where $$I'=IA-QB \quad (2)$$

$$Q'=QA+IB \quad (3)$$

where I' and Q' are the pre-distorted in-phase and quadrature baseband signals generated by pre-distorter 12, and A and B are pre-distortion parameters that are a function of the instantaneous envelope power of the input signal represented by I and Q. Conveniently, different values for parameters A and B may be stored in a look-up table (which is generated as described below) with the index being the instantaneous envelope power given by $(I^2+Q^2)$.

Figure 2:
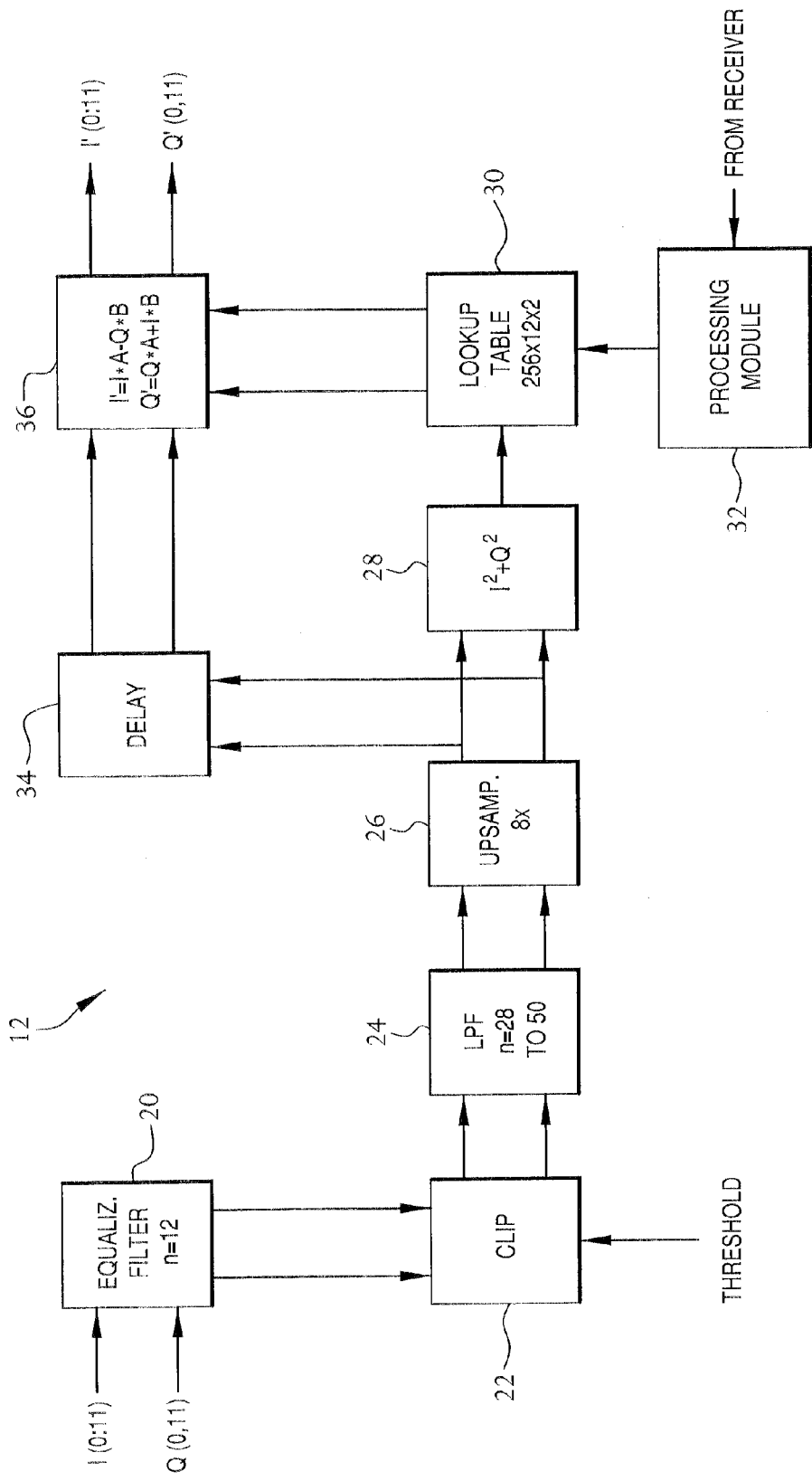
FIG. 2 shows a block diagram of the digital pre-distorter of FIG. 1.

FIG. 2 shows a block diagram of digital pre-distorter 12 of FIG. 1, in accordance with the pre-distortion technique of the '490 application. As shown in FIG. 2, pre-distorter 12 includes an equalization filter 20 for receiving the signal that is comprised of the in-phase and quadrature components described above. The equalization filter is a component that is well known in the art and is operatively connected to a clipping module 22 that clips the signal to a predetermined threshold. The output of clipping module 22 is fed to a low-pass filter 24 that eliminates the high-frequency components that are generated during clipping.

The output of low-pass filter 24 is fed to a sampling module 26 that provides an up-sampled signal (e.g., increases the sampling rate by a factor of four from an original 2× rate to an 8× rate) to an index calculating module 28, which calculates an index value based on the sum of the squares of the in-phase and quadrature components of the baseband signal. Index calculating module 28 is connected to a look-up table 30 having stored therein parameters A and B. Values for parameters A and B are retrieved based on the calculated index value.

The pre-distortion parameters A and B of look-up table 30 are derived from a set of polynomial equations that closely approximate the corrections used to linearize the amplifier characteristics. Because of the complex nature of the characteristics of amplifiers, such as class AB amplifiers, advantageous results are obtained by using a pair of polynomial equations for parameter B, while a single polynomial equation is sufficient for parameter A. (As an approximation, it can be said that parameter A corrects the magnitude distortion of the amplifier, while parameter B corrects the phase distortion.) These polynomial equations can be written according to Equations (4)-(7) as follows:

$$A=C_0+C_1P+C_2P^2+C_3P^3 \text{ for } A \leq A_m \quad (4)$$

$$A=A_m \text{ otherwise} \quad (5)$$

$$B=C_4P+C_5P^2+C_6P^3 \text{ for } P \leq P_b \quad (6)$$

$$B=(B_{b1}-B_{b2})+C_7P+C_8P^2+C_9P^3 \text{ for } P>P_b \quad (7)$$

where $P=(I^2+Q^2)$ is the instantaneous envelope power. $A_m$ is a maximum value imposed on parameter A to prevent the amplifier from being driven deep into saturation. A typical value for $A_m$ is 2, but it can vary depending on the detailed design. $P_b$ is a breakpoint where parameter B transitions between Equations (6) and (7). $P_b$ is an optimizable parameter whose value is obtained by the optimization algorithm. The value varies from amplifier to amplifier. It can also vary with temperature. Bb1 and $B_{b2}$ are the values of parameter B at $P=P_b$ using Equations (6) and (7), respectively. The first term on the right-hand side of Equation (7) is intended to make Equations (6) and (7) continuous at $P=P_b$. $C_0$ through $C_9$ are coefficients that pertain to the transfer function characteristics of a particular amplifier and which can vary with temperature, aging of the amplifier components, etc. As with $P_b$, the optimization algorithm finds values for coefficients $C_0$ through $C_9$ that give optimized results.

Of course, it should be appreciated that, in appropriate circumstances, two polynomial equations may be used for parameter A as well as for parameter B. Furthermore, in many instances it is possible to reduce Equations (4) and (6) to exclude terms higher than the linear P term, resulting in Equations (4')-(7') as follows:

$$A=C_0+C_1P \text{ for } P \leq P_b \quad (4')$$

$$A=(A_{b1}-A_{b2})+C_2P+C_3p^2+C_4P^3 \text{ for } P>P_b \quad (5')$$

$$B = C_5 P \text{ for } P \leq P_b \qquad (6')$$

$$B = (B_{b1} - B_{b2}) + C_6 P + C_7 P^2 + C_8 P^3 \text{ for } P > Pb \qquad (7)$$

where $A_{b1}$ and $A_{b2}$ are the values of parameter A at $P=P_b$ using Equations (4') and (5'), respectively. As before, a maximum limit $A_m$ can be placed on the value of parameter A. Also, if necessary, the breakpoint $P_b$ where the transition is made from one polynomial equation to the other can have a different value for the A equations than for the B equations.

To accommodate the time-varying nature of the coefficients (e.g., $C_0$-$C_9$ in Equations (4)-(7)), an adaptive scheme is employed in this pre-distortion technique whereby the values of the coefficients are at least intermittently optimized (or operated on) to maintain minimum or reduced spurious emissions. Referring again to FIG. 1, coupler 17 at the output of amplifier 16 samples the output and receiver 18, which is tuned to the frequency region where the spurious emissions are to be reduced or minimized, generates a voltage proportional to the received power. Multiple receivers can be used to sample the spurious emissions at more than one frequency or a single receiver can tune sequentially to the different frequencies of interest. The voltages obtained at the different frequencies are then combined into a single quantity whose value is to be reduced or minimized. When two frequencies are used, which is generally sufficient, the resultant voltages, $V_1$ and $V_2$, can be combined according to Equation (8) as follows:

$$V = V_1 + V_2 + |(V_1 - V_2)| \qquad (8)$$

where $|(V_1-V_2)|$ is the absolute value of $(V_1-V_2)$. Such use of an absolute value causes both $V_1$ and $V_2$ to be reduced or minimized, instead of simply providing the sum of the two values. If only the first two terms on the right-hand side of Equation (8) were used, the algorithm might find a false optimum by making one voltage very small and the other quite large. An alternative to Equation (8) is V=max ($V_1$, $V_2$), where max means choose the larger of the values.

A suitable algorithm to find the values of the coefficients that reduce or minimize V, and thus the spurious emissions, is the well-known simplex algorithm, described by Nelder and Mead in "A Simplex Method For Function Minimization," Computer Journal, Vol. 7, pp. 308-3 13 (1965), which is incorporated herein by reference. As will be described below, the algorithm is implemented in modified form.

Referring again to FIG. 2, based on the feed-back signal from receiver 18 of FIG. 1, processing module 32 implements the modified simplex algorithm to update the values of parameters A and B stored in look-up table 30. It should be appreciated that processing module 32 may take a variety of forms such as a microprocessor, a digital signal processor, or a processing circuit using FPGA devices. It should be further appreciated that the simplex algorithm may be implemented in any suitable manner that utilizes appropriate combinations of hardware and software that will be apparent to those of skill in the art upon a reading hereof. Of course, the device used to implement the algorithm (here, module 32) should include suitable storage capacity to store and maintain the code and data necessary to run the algorithm.

At each iteration, the values of the coefficients derived by the algorithm are used in the equations for A and B described above to generate a table which is used by the algorithm for the next iteration. The algorithm is allowed to run continuously, or at least intermittently, so that the coefficient values track changes that occur over time.

The simplex optimization algorithm as developed by Nelder and Mead was intended for minimizing or reducing function values, which were obtained by mathematical computations. An important aspect of this mode of operation is that, if a computation is repeated, the same function value is obtained. This contrasts with values obtained by measurements on operating hardware where noise and fluctuations inevitably result in varying measured values. This difference has an important consequence when an attempt is made to use the simplex algorithm in real time on operating hardware.

The essence of the simplex algorithm is that, at each iteration, the set of coefficients that is associated with the worst function value is replaced with a new set which gives a better function value. This new value might or might not be better than the best function value obtained up to that time, but as the algorithm progresses it is expected that better and better function values will be obtained. Suppose that, as a result of noise and fluctuations in the measurements, an exceptionally good but erroneous value is obtained. If subsequent values obtained are all worse than this erroneous value, then the algorithm will converge on the erroneous value. Thus, in its conventional form, the algorithm is not very suitable for use in situations where considerable fluctuations exist in the quantity being optimized or operated on as may be in the present case.

To circumvent this difficulty, the simplex algorithm is used in modified form. At the end of each iteration, if the previous best value is replaced by a better value, then the algorithm proceeds to the next iteration. However, if an iteration does not yield a new best value, then the existing best point is re-evaluated and the new value is substituted for the previous one. Thus, the algorithm is able to recover from erroneous data due to fluctuating measurements. These fluctuations may result in a larger number of iterations in order to reach a desired point (which could be an optimum point), but will not prevent the desired point from being reached.

Another modification of the simplex algorithm enables it to operate continuously to track changes in amplifier characteristics caused by temperature changes, aging of components, or other disturbances. In the conventional implementation of the algorithm, an exit criterion is established (the criterion is usually related to the fractional variation of the function values between the worst and best points of the simplex) and the algorithm terminates when the criterion is satisfied. As the desired or optimum point is approached, the algorithm reduces the size of the simplex which typically becomes very small by the time the desired point is reached. Once this happens, the algorithm is no longer able to react to changes in amplifier characteristics.

In preferred implementations, the size of the simplex is prevented from becoming too small by comparing it to a value, such as a preset minimum value, at the start of each iteration and increasing the size to the value if it has been reduced below it. The value is chosen such that it is large enough to enable the algorithm to track changes in the amplifier characteristics but not so large that the desired (or optimum) point cannot be reached. A suitable value is one where the value of each coefficient at the worst point of the simplex differs from the corresponding value at the best point by 5 to 10 percent.

With continuing reference to FIG. 2, the output of sampling module 26 is also connected to a delay circuit 34, which is, in turn, connected to an output module 36 that generates an output signal based on the values of parameters A and B retrieved from look-up table 30 and the delayed upsampled signal from delay circuit 34. The delay applied by delay circuit 34 is preferably equivalent to the delay involved in performing the processing of modules 28 and 30 so that the appropriate values of (I and Q) and (A and B) arrive at output module 36 at the same time.

Figure 3:
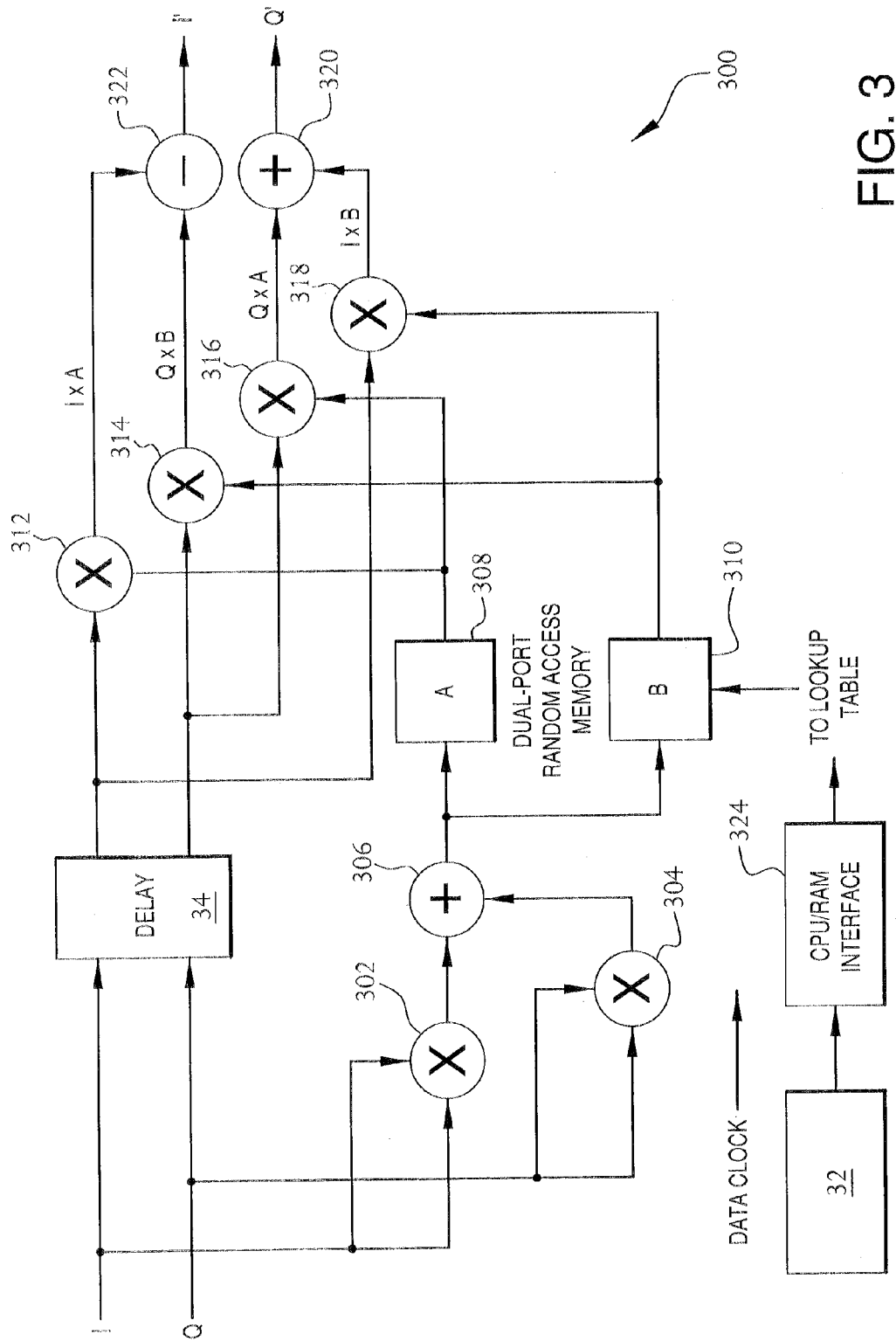
FIG. 3 shows a block diagram of an exemplary FPGA implementation of the index calculating module, the delay block, the look-up table, and the output module of FIG. 2.

FIG. 3 shows a block diagram of an exemplary FPGA implementation 300 of index calculating module 28, delay 34, look-up table 30, and output module 36 of FIG. 2. The I and Q data paths are independently squared at multipliers 302 and 304 to create $I^2$ and $Q^2$, respectively. These two values are added together at adder block 306 to form an index address for look-up table 30, which, in FIG. 3, takes the form of two separate dual-port RAM memory blocks 308 and 310, which contain the parameters A and B, respectively. The parameters output from the memory blocks are multiplied by the delayed I and Q values at multipliers 312, 314, 316, and 318 to create the four values I×A, I×B, Q×A, and Q×B. These are combined by adder and subtractor blocks 320 and 322 to form (IA−QB) and (QA+IB), respectively, which are output as I' and Q'.

Additional circuitry 324 loads the dual-port memory blocks 308 and 310 with parameter data generated in processing module 32 using standard memory interface signals. The use of dual-port memory permits real-time updating of the look-up tables without disrupting the accessing of parameter values by the pre-distortion process.

A look-up table configuration is not necessary where, for example, the processing module has a sufficiently high processing speed to allow for the obtaining of the A and B parameters on an "as needed" basis. In this case, the processing module calculates the appropriate coefficients and the A and B parameters are subsequently calculated by the processing module as needed or desired without storing such parameters in a look-up table.

Referring again to FIG. 1, receiver 18 in the digital pre-distortion adaptive feedback loop is used to measure the RF power over a narrow bandwidth at a specific frequency. This tuned frequency is offset from, for example, the main CDMA carrier frequency and is a frequency where the spurious emissions are to be minimized by the optimization algorithm.

Figure 4:
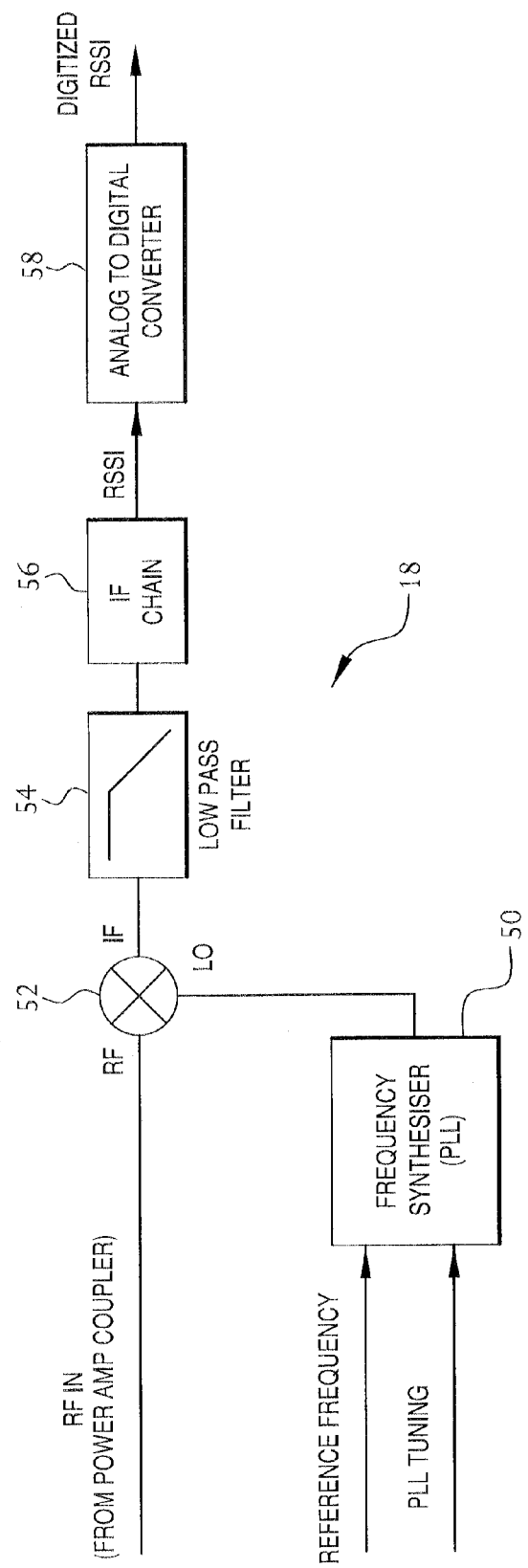
FIG. 4 shows a block diagram of an exemplary single-channel, single-conversion implementation of the receiver of FIG. 1.

FIG. 4 shows a block diagram of an exemplary single-channel, single-conversion implementation of receiver 18 of FIG. 1. In this implementation, receiver 18 includes a frequency synthesizer 50, which is connected to a mixer 52. The output of mixer 52 is connected to a low-pass filter 54, which in turn is connected to an intermediate frequency (IF) chain 56. The output of IF chain 56 is connected to an analog-to-digital converter (ADC) 58, which then provides input to processing module 32 of FIG. 2. Three important frequencies in FIG. 4 are the RF frequency where the adjacent power level is to be measured, the local oscillator (LO) frequency which is varied as needed to tune the receiver, and intermediate frequency (IF) which is fixed. The LO frequency is found by LO=RF−IF.

More particularly, as shown in FIG. 1, the RF input of receiver 18 is coupled off the output of power amplifier 16 by coupler 17. This wide-band RF signal is down-converted to an intermediate frequency (IF) at mixer 52, where IF=RF−LO. The LO frequency for mixer 52 is generated by a phase-locked loop (PLL) frequency synthesizer 50. This LO frequency is set by (digital) tuning commands from a microprocessor (e.g., processing module 32 of FIG. 2).

Low-pass filter 54 is used to filter the RF+LO frequency products, as well as the RF and LO feed-through, and any higher frequency products produced by mixer 52. The receiver IF chain 56 is shown as a single block in FIG. 4. In one implementation, IF chain 56 actually includes amplifiers and a narrow bandpass filter, which assures that the power being measured is truly the power at the tuned frequency and does not contain power from, for example, the main CDMA carrier. IF chain 56 produces a Received Signal Strength Indicator (RSSI) voltage output that is proportional to the IF power, which in turn is proportional to the RF power. The RSSI voltage is sampled by ADC 58, where the resulting digitized RSSI is a digital word (which represents the power level at the tuned frequency) that is used by the optimization algorithm implemented by processing module 32 of FIG. 2.

In some implementations, the optimization algorithm monitors the spurious emissions at multiple frequency points, in which case, the single-channel receiver of FIG. 4 may be re-tuned for each different frequency. This re-tuning can be done with a procedure similar to the following:

A microprocessor (e.g., processing module 32) sends a tuning command to the frequency synthesizer to set the LO frequency (and therefore the receiver's tuned frequency).

The microprocessor waits for the PLL and RSSI to settle.

The digitized RSSI value is read by the microprocessor. Multiple readings could be taken if an average RSSI is used.

These steps are repeated for the next frequency.

The pre-distortion technique of the '490 application was designed to correct for at least some of the non-linearities of the amplifier by pre-distorting both the magnitude of the baseband signal (primarily achieved using the parameter A) as well as the phase (primarily achieved using the parameter B). There are, however, applications where the characteristics of the signal (ratio of peak power to average power close to 1, as in a single-channel TDMA system) do not allow substantial expansion of the magnitude so that the magnitude non-linearity of the amplifier cannot be corrected as fully as might be desired. In these applications substantial improvement can be obtained by correcting the phase as much as possible (via the parameter B) and correcting the magnitude partially by appropriate setting of the $A_m$ value.

Frequency-Dependent Phase Pre-Distortion

As described in the previous section, the pre-distortion technique of the '490 application can be used to achieve a substantial reduction in spurious emissions, but it is frequently observed that some residual spurious emissions are still present. Attempts to reduce these residual spurious emissions by modifying the coefficients in Equations (4) to (7) (or in Equation (4') to (7')) result in an asymmetrical situation where a reduction in the spurious emissions on the low-frequency side of a communication channel are accompanied by an increase in the spurious emissions on the high-frequency side of the channel, and vice-versa, resulting in an overall degradation—or at least no overall improvement—in performance.

According to embodiments of the present invention, in order to reduce the spurious emissions to a level lower than that achieved by the (frequency-independent) pre-distortion technique of the '490 application, frequency-dependent phase distortion is also applied, in which an element of pre-distortion with a phase that varies with frequency is added in such a manner as to produce a phase difference of 180° between a critical frequency on the low-frequency side of the channel and a corresponding critical frequency on the high-frequency side of the channel.

As used in this specification, the term "critical frequencies" refers to frequencies where the difference between the spurious emissions and the limits set by the relevant regulatory or standards body is largest (in the frequency region where the spurious emissions exceed the limits). These critical frequencies will, of course, depend on the particular standard being implemented. For example, the 3GPP (Third Generation Partnership Program) standard for UMTS sets spurious emissions limits at various frequency offsets from the center of the communication channel with the most difficult one to meet in many instances being a limit of −13 dBm in a bandwidth of 1 MHz at frequency offsets of ±4 MHz from the center of the communication channel. Thus, in this case, the critical frequencies are −4 MHz and 4 MHz away from the center of the channel. Using the criterion stated above, the additional pre-distortion component for preferred embodiments of the present invention would have a phase difference of 180° between these two frequencies. Although 180° is preferred, other phase differences are possible, including those that differ only slightly from 180°. It will also be understood that, in addition to 180°, other preferred phase differences are 180°+n×360°, where n is an integer. In addition, although critical frequencies are typically equidistant from the center of the channel, such equidistance is not strictly necessary.

A phase difference that varies with frequency can be produced by advancing or delaying in time an additional pre-distortion component relative to the main pre-distorted signal of the '490 application according to Equation (9) as follows:

$$\Delta\Phi = \pm 2\pi(\Delta f)\tau \tag{9}$$

where $\Delta\phi$ is the phase difference between two critical frequencies, $\Delta f$ is the frequency difference between the two critical frequencies, and $\tau$ is the time difference between the main pre-distorted signal and the additional frequency-dependent phase distortion signal. In Equation (9), the plus sign refers to a time advance and the minus sign refers to a time delay. Since a phase difference of 180° (i.e., $\pi$ radians) is desired, Equation (9) becomes Equation (10) as follows:

$$\tau = \pm 1/(2\Delta f) \tag{10}$$

For the UMTS example discussed above, where the frequency difference is 8 MHz, Equation (10) yields $\tau=\pm 62.5$ nanoseconds. A UMTS signal has a chip rate of 3.84 million samples/second (Ms/s) and a commonly used sampling rate is 8 times the chip rate, i.e., 30.72 Ms/s. At this sampling rate, two consecutive samples represent a time difference of 65.1 ns which is sufficiently close to the calculated value of 62.5 ns. Thus, in this example, the additional pre-distortion signal should be advanced or delayed by 2 samples relative to the main signal.

Single Additional Pre-Distortion Component

Equation (1) can now be re-written to include an additional, frequency-dependent phase pre-distortion component of the present invention according to Equation (11) as follows:

$$I'+jQ' = (I+jQ)(A+jB) + (I+jQ)(X+jY)_n \tag{11}$$

where the subscript n indicates that the second term on the right hand side is advanced or delayed by n samples relative to the first term (e.g., n=2 for the example given above). In Equation 11, the parameters X and Y are functions of the instantaneous envelope power P analogously to the parameters A and B, and they can be written in polynomial form similar to Equations (4) to (7) (or (4') to (7')). (Note, however, that a constant term (i.e., analogous to $C_0$ in Equations (4) and (4')) is not included in the polynomial equation for X. If it were included, then the undistorted waveform would appear twice in the output.) In many instances, however, it is unnecessary to include all the terms in the polynomial equations; often just the term linear in P suffices, resulting in Equations (12) and (13) as follows:

$$X = C_{10}P \tag{12}$$

$$Y = C_{11}P \tag{13}$$

The two (or more if appropriate) new coefficients $C_{10}$ and $C_{11}$ are adaptively optimized along with the other coefficients in the manner described in the previous section for coefficients $C_0$-$C_9$.

Figure 5:
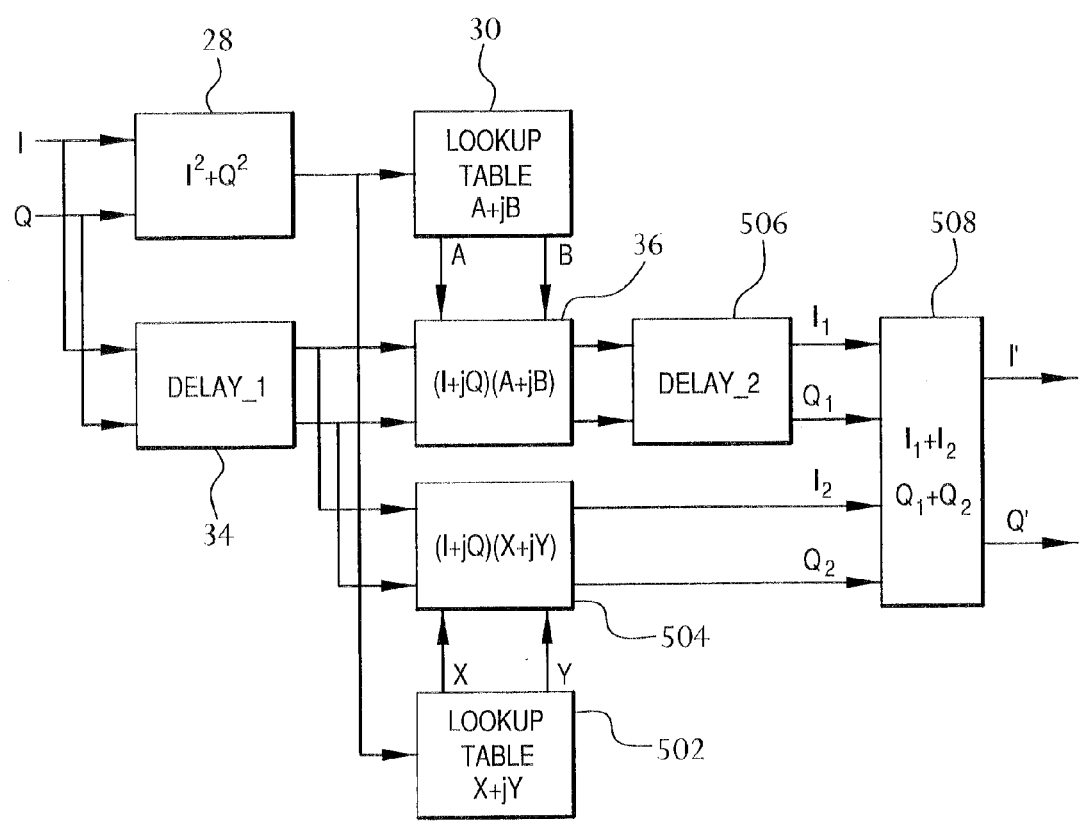
FIGS. 5 and 6 show block diagrams of implementations in which a frequency-dependent phase pre-distortion component of the present invention is applied in conjunction with the main pre-distortion signal of the '490 application.
Figure 6:
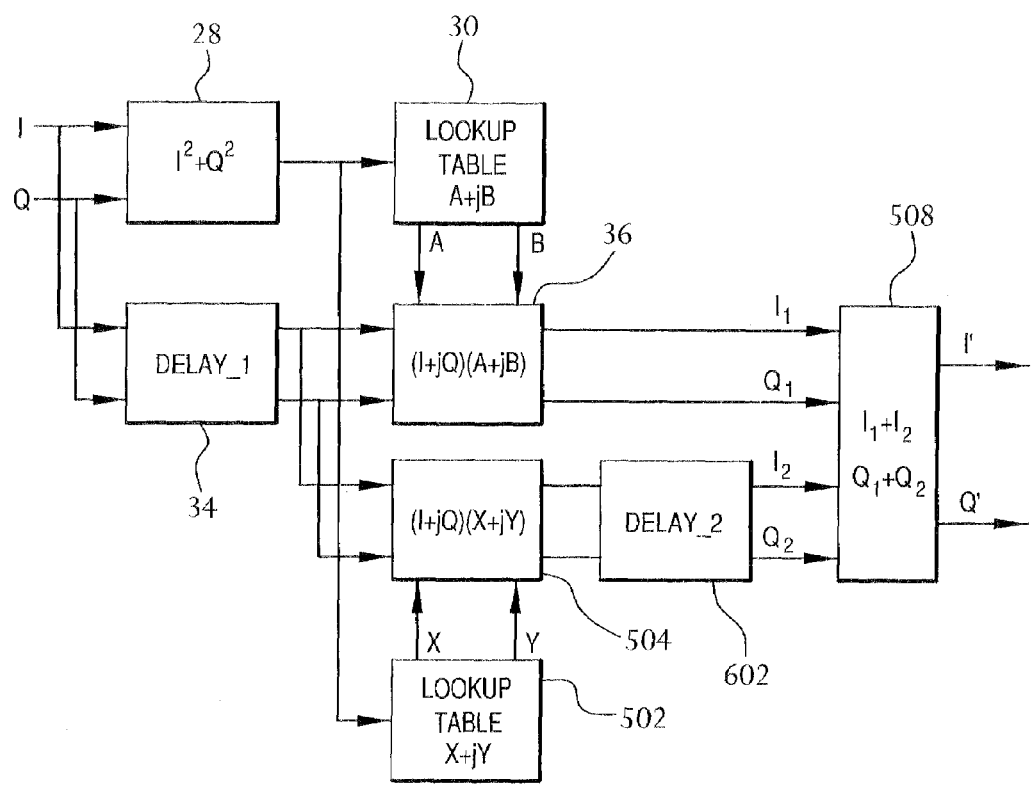

FIGS. 5 and 6 show block diagrams of hardware (e.g., FPGA, ASIC, or DSP) implementations in which an additional, frequency-dependent phase pre-distortion component in accordance with the present invention is combined with the main pre-distorted signal generated in accordance with the '490 application. In particular, index calculating module 28, look-up table 30, delay 34, and output module 36 of pre-distorter 12 of FIG. 2 are shown as being part of the configurations of FIGS. 5 and 6. In addition, in FIGS. 5 and 6, look-up table 502 retains values for the parameters X and Y that are accessed based on the index generated by module 28 and then used by module 504 to calculate the second term in Equation (11) (i.e., an additional, frequency-dependent phase pre-distortion component of the present invention).

In FIG. 5, the main pre-distorted signal (i.e., the output of module 36) is delayed by delay block 506 relative to the additional pre-distortion signal (i.e., the output of module 504), thus effectively advancing in time the additional pre-distortion signal, while, in FIG. 6, the additional pre-distortion signal is shown delayed by delay block 602 relative to the main pre-distorted signal, thus effectively delaying in time the additional pre-distortion signal. In both figures, delay block 34 compensates for the time required to compute the value of $(I^2+Q^2)$ by module 28 and retrieve values of A, B, X, and Y from look-up tables 30 and 502. The two configurations shown in FIGS. 5 and 6 produce similar results when the pre-distortion parameters X and Y have the opposite sign in one case relative to the other. In both FIGS. 5 and 6, the main pre-distorted signal $(I_1, Q_1)$ is combined with the additional pre-distortion signal $(I_2, Q_2)$ in module 508 to generate the new, combined pre-distorted signal $(I', Q')$, which may then be modulated and amplified (e.g., by modulator 14 and amplifier 16 of FIG. 1) for transmission.

In FIGS. 5 and 6, both sets of polynomial equations for A and B and for X and Y are shown implemented as look-up tables. In some instances, the value of Y is so small that setting Y=0 results in a negligible loss of performance. In this case, look-up table 502 for (X+jY) can be omitted, and module 504 for (I+jQ)(X+jY) can be replaced by (I+jQ)$C_{10}$P.

Multiple Additional Frequency-Dependent Phase Pre-Distortion Components

The configurations of FIGS. 5 and 6 correspond to applications in which a single additional, frequency-dependent phase pre-distortion component of the present invention has been added to achieve a desired (e.g., 180°) phase shift between a single pair of critical frequencies, one on either side of the channel. Situations also arise where more than one pair of critical frequencies exist, for example, in networks employing multiple carriers. In these cases, additional advanced/delayed pre-distortion paths can be included, whereby Equation (11) becomes Equation (14) as follows:

$$I'+jQ' = (I+jQ)(A+jB) + (I+jQ)(X_1+jY_1)_{n1} + (I+jQ)(X_2+jY_2)_{n2} + \tag{14}$$

where subscripts n1, n2, etc., represent the advances/delays associated with two or more different pairs of critical frequencies. Conventional standards specify frequencies that are symmetrical about the center frequency. In general, however, since the relationship between the frequency difference and the advance/delay does not need to be exact, there is some leeway if the frequencies are asymmetrical.

Figure 7:
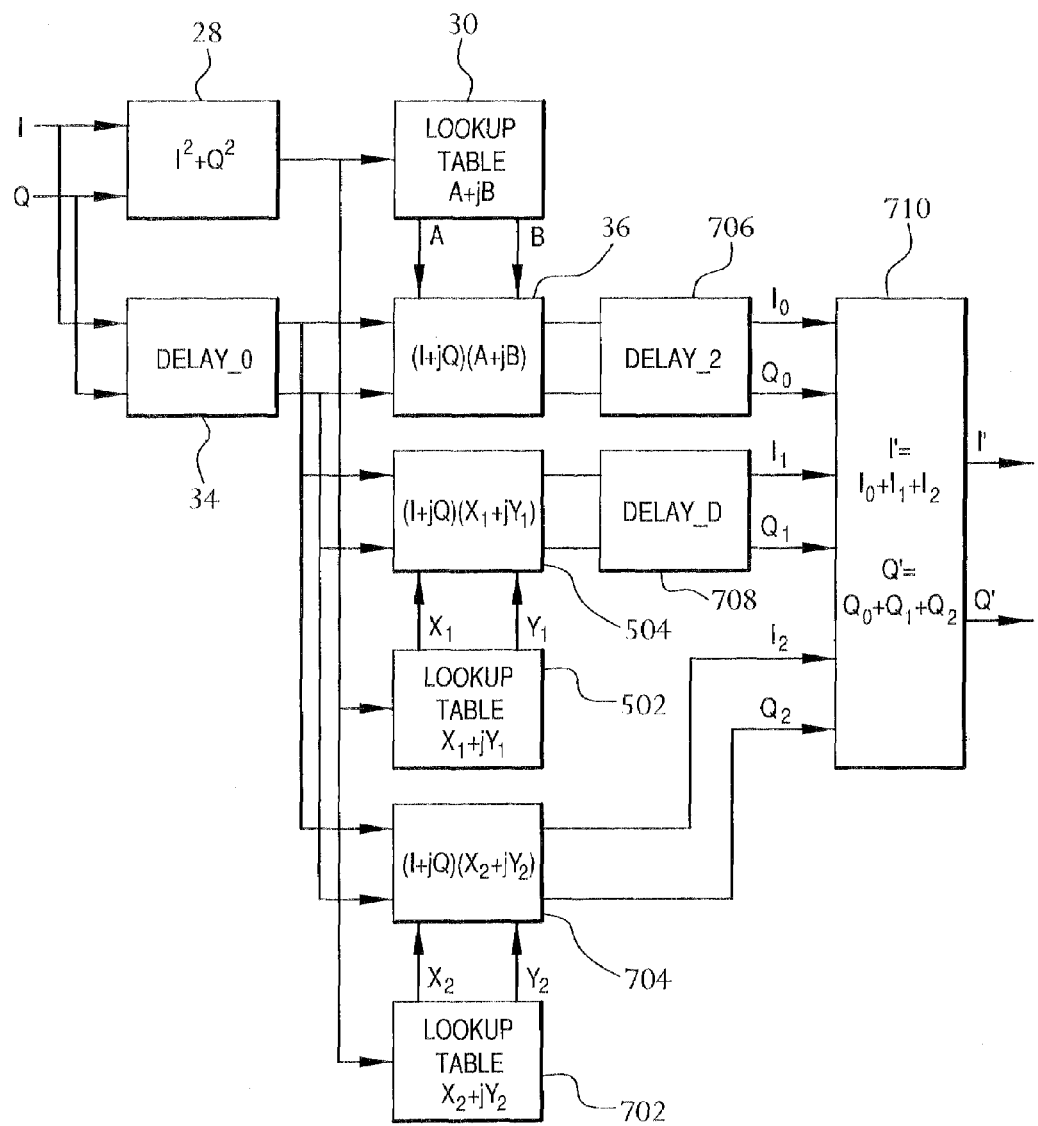
FIGS. 7 and 8 show block diagrams of implementations in which frequency-dependent phase pre-distortion components of the present invention are included for two different pairs of critical frequencies.
Figure 8:
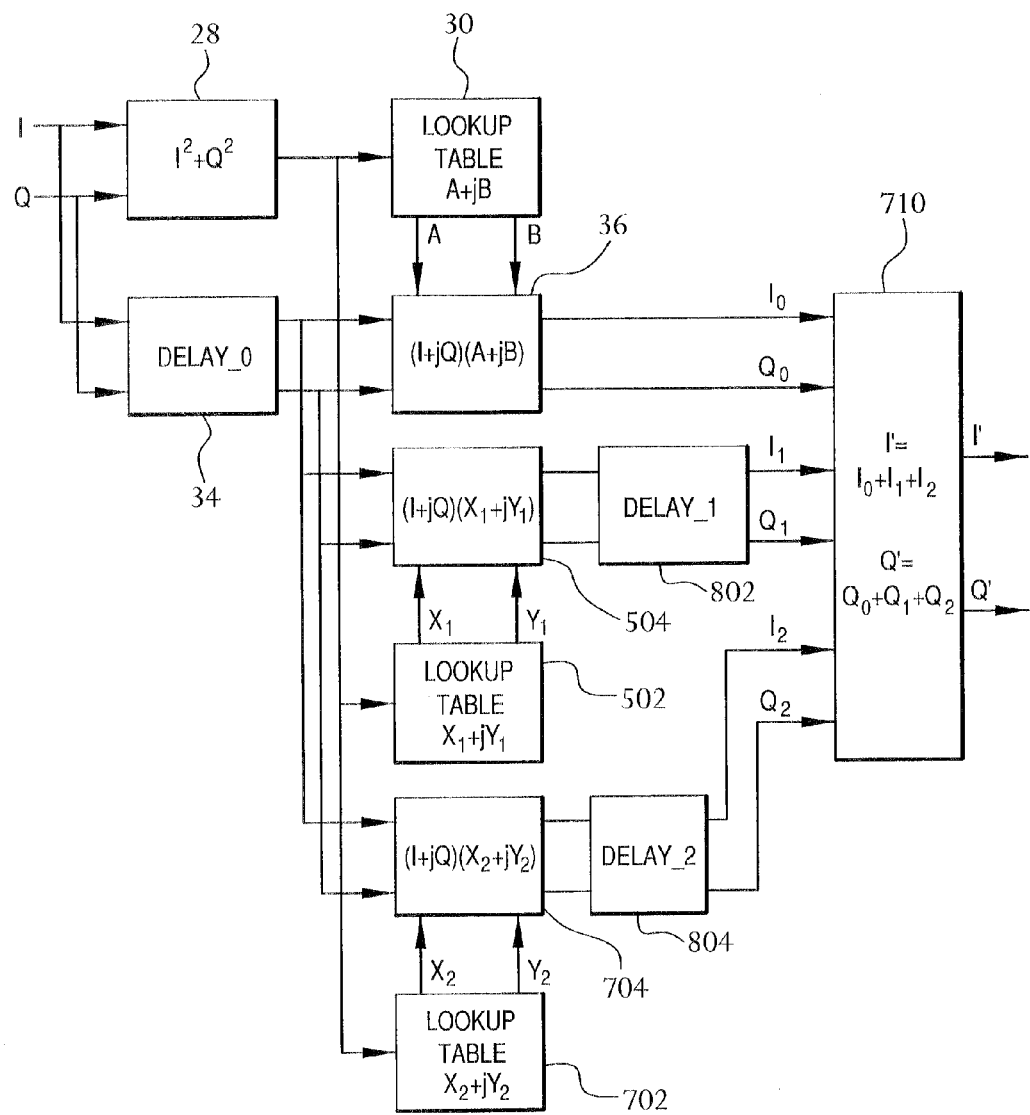

FIGS. 7 and 8 shows block diagrams of two possible implementations of Equation (14) for applications in which additional, frequency-dependent phase pre-distortion components of the present invention are included for two different pairs of critical frequencies, in which look-up table 502 and module 504 correspond to frequency-dependent phase pre-distortion based on a first pair of critical frequencies and look-up table 702 and module 704 correspond to frequency-dependent phase pre-distortion based on a second pair of critical frequencies. FIG. 7 corresponds to an "advanced-in-time" case, while FIG. 8 corresponds to a "delayed-in-time" case. In these figures, the number of additional pre-distortion components has been limited to two to avoid cluttering the figures, but additional components can be added in an analogous manner.

In FIG. 7, delay block 706 corresponds to the largest time advance in the implementation, while delay block 708 corresponds to the difference between that largest time advance and the time advance associated with the corresponding term in Equation (14). In FIG. 8, delay block 802 corresponds to delay n1 in Equation (14), while delay block 804 corresponds to delay n2 in Equation (14). In both configurations, module 710 combines the three different terms in Equation (14) to generate the combined pre-distortion values I' and Q'. As with FIGS. 5 and 6, the two configurations shown in FIGS. 7 and 8 produce similar results when the pre-distortion parameters in look-up tables 502 and 702 of one configuration have the opposite sign as the pre-distortion parameters in the corresponding look-up tables of the other configuration.

Frequency-Dependent Phase Pre-Distortion in the RF Domain

The implementations discussed so far are applicable to situations where the baseband signals I and Q are available. When the baseband signals are not readily available, it may be advantageous to apply pre-distortion to the input signal in the RF domain.

Figure 9:
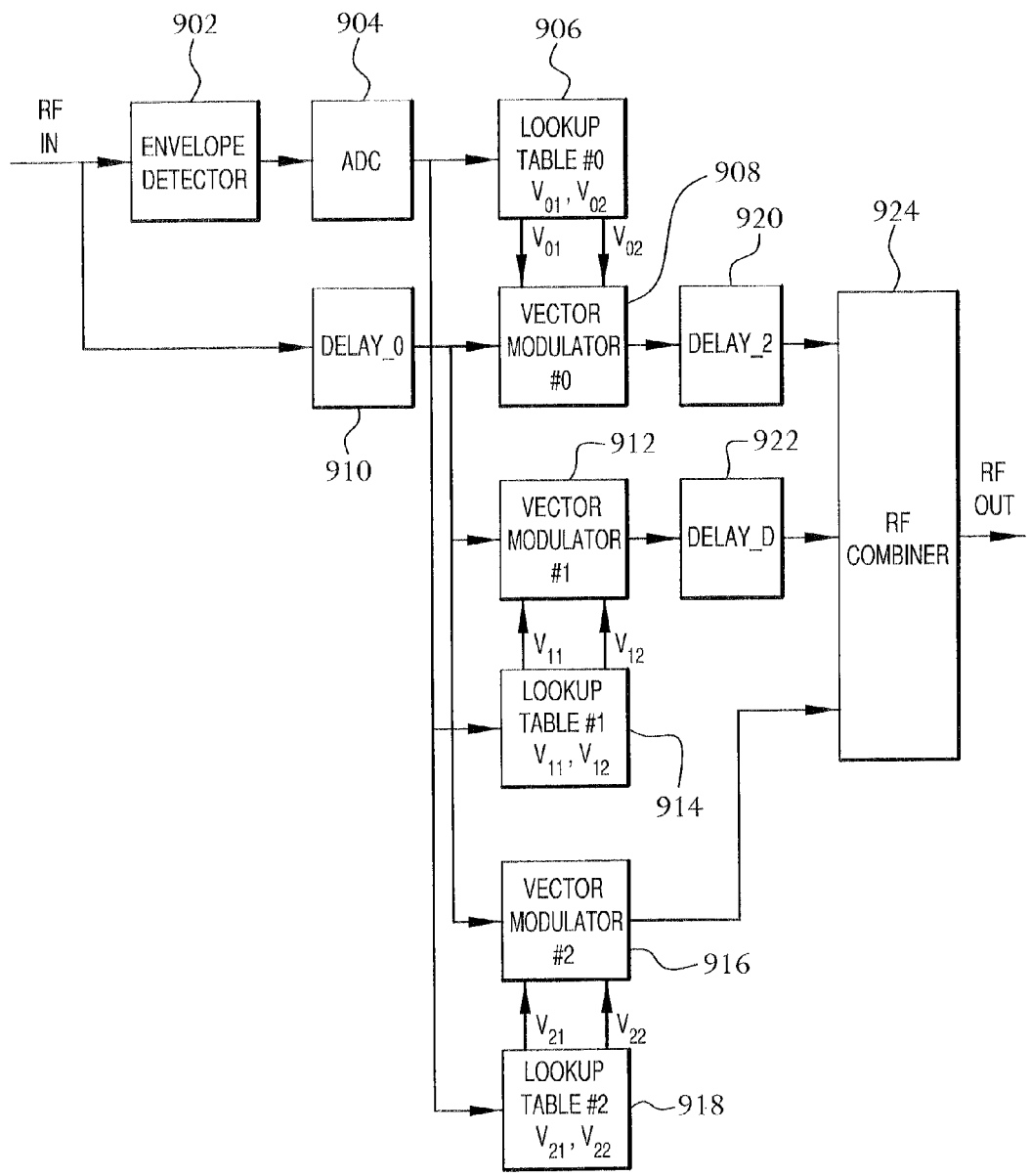
FIGS. 9 and 10 show block diagrams of implementations of RF-based pre-distorters, according to two different embodiments of the present invention.
Figure 10:
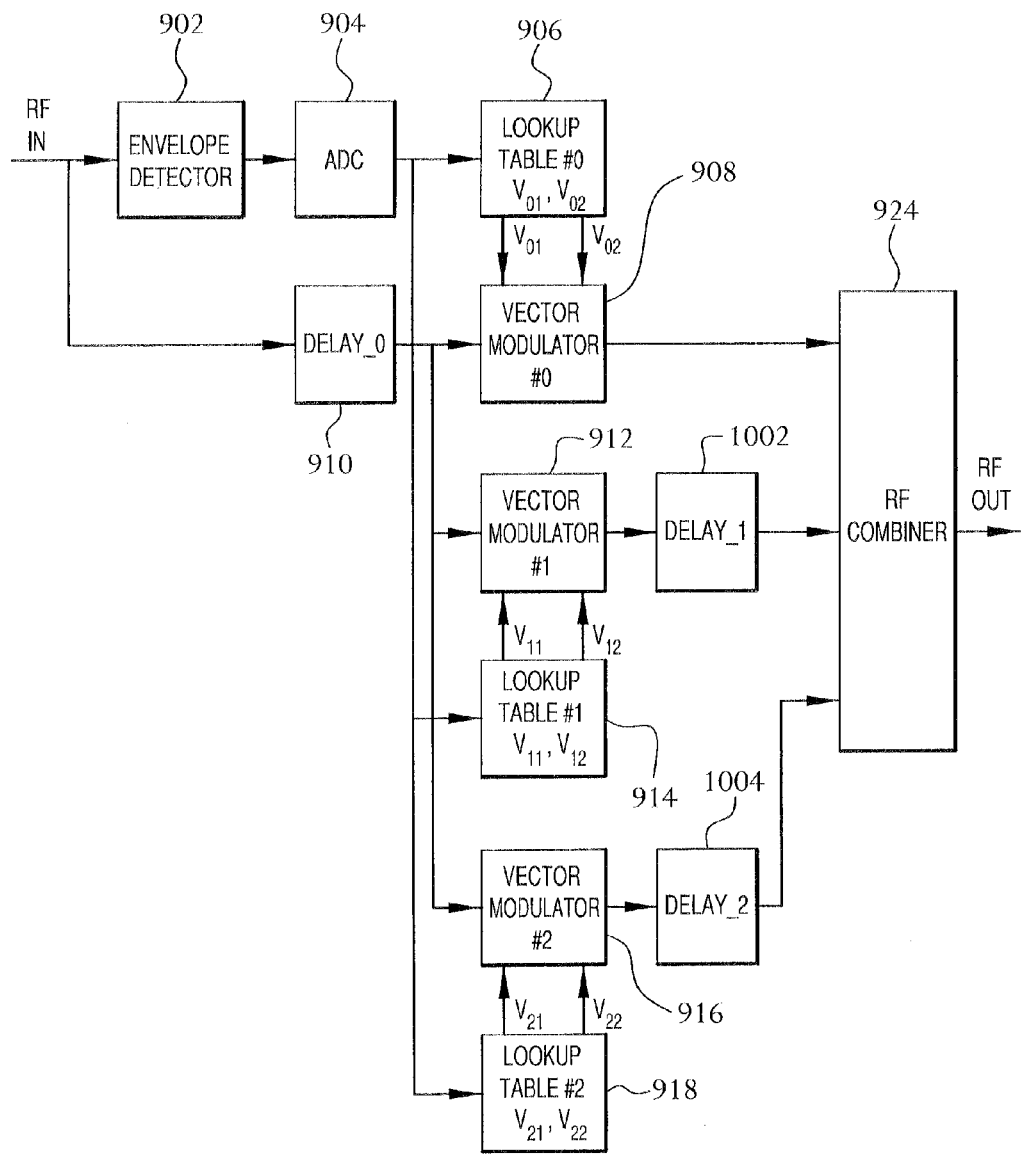

FIGS. 9 and 10 show block diagrams of possible hardware implementations of RF-based pre-distorters, according to two different embodiments of the present invention. In FIGS. 9 and 10, two additional, frequency-dependent phase pre-distortion components of the present invention are generated, although alternative embodiments may involve generation of only one or more than two such pre-distortion components. FIG. 9 shows a time-advance implementation, while FIG. 10 shows a time-delay implementation. With the exception of analog-to-digital converter (ADC) 904, there is a one-to-one correspondence between the modules in the RF implementations of FIGS. 9 and 10 and the modules in the baseband implementations of FIGS. 7 and 8. As with FIGS. 7 and 8, the two configurations shown in FIGS. 9 and 10 produce similar results when the pre-distortion parameters in look-up tables 914 and 918 of one configuration have the opposite sign as the pre-distortion parameters in the corresponding look-up tables of the other configuration.

In particular, in FIGS. 9 and 10, the RF input signal is split into two paths, one of which goes to envelope detector 902, which produces an output signal proportional to the instantaneous value of the RF input power. This signal is digitized by ADC 904, whose digital output is used to fetch a pair of control signal values (e.g., voltages $V_{o1}$ and $V_{o2}$) from look-up table 906. The pair of control signals is applied to vector modulator 908, whose function is to modify the magnitude and phase of the RF signal in accordance with the control signals. The second RF input signal path goes to delay block 910 (e.g., a length of coaxial cable), which causes the RF signal to arrive at vector modulator 908 at the same time as the control signals.

The output of delay block 910 is split into three RF signal paths corresponding to vector modulators 908, 912, and 916. The output of vector modulator 908 constitutes the main distorted signal, corresponding to $I_0$, $Q_0$ in FIGS. 7 and 8. Vector modulators 912 and 916 provide the advanced/delayed pre-distortion signals corresponding to $I_1$, $Q_1$ and $I_2$, $Q_2$ in FIG. 7. Vector modulator 908 is configured such that, in the absence of control signal inputs, the RF signal passes through without (or with minimal) distortion, whereas vector modulators 912 and 916 are configured such that, in the absence of control signal inputs, little or no RF signal passes through. Thus, when control signals are applied, vector modulator 908 produces the original RF signal plus a pre-distortion signal, whereas vector modulators 912 and 916 produce essentially pre-distortion signals only.

Delay blocks 920 and 922 in FIG. 9 are analogous to delay blocks 706 and 708 in FIG. 7, while delay blocks 1002 and 1004 in FIG. 10 are analogous to delay blocks 802 and 804 in FIG. 8. In both FIGS. 9 and 10, the resulting main pre-distorted signal and additional frequency-dependent phase pre-distortion signals are combined together by an RF combiner 924, where the combined signal constitutes the RF output signal that is applied to the amplifier.

Since, in these RF implementations, the input signal is pre-distorted in the RF domain, a modulator similar to IQ modulator 14 of FIG. 1 may be omitted. In other implementations in which the input signal is pre-distorted at a lower frequency (e.g., in the IF domain), a mixer would be needed to convert the resulting pre-distorted IF signal to the RF domain prior to being applied to the amplifier.

Figure 11:
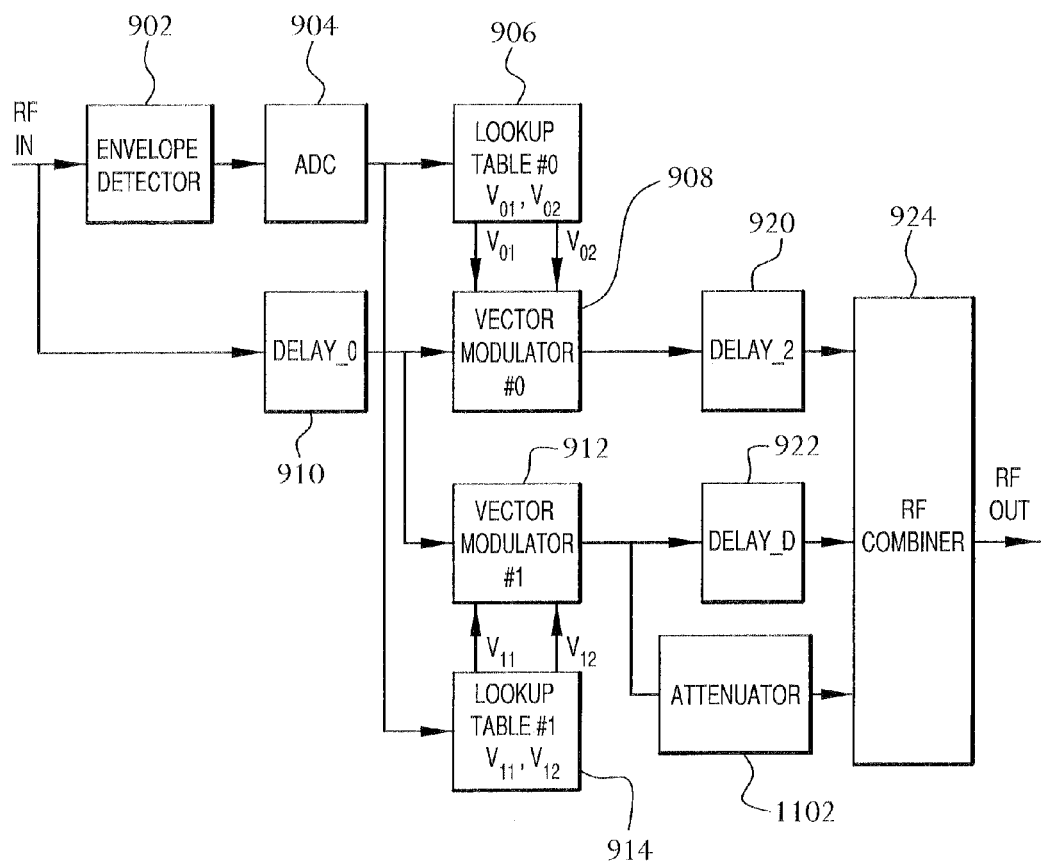
FIGS. 11 and 12 show block diagrams of alternative implementations of the RF-based pre-distorters of FIGS. 9 and 10, respectively.
Figure 12:
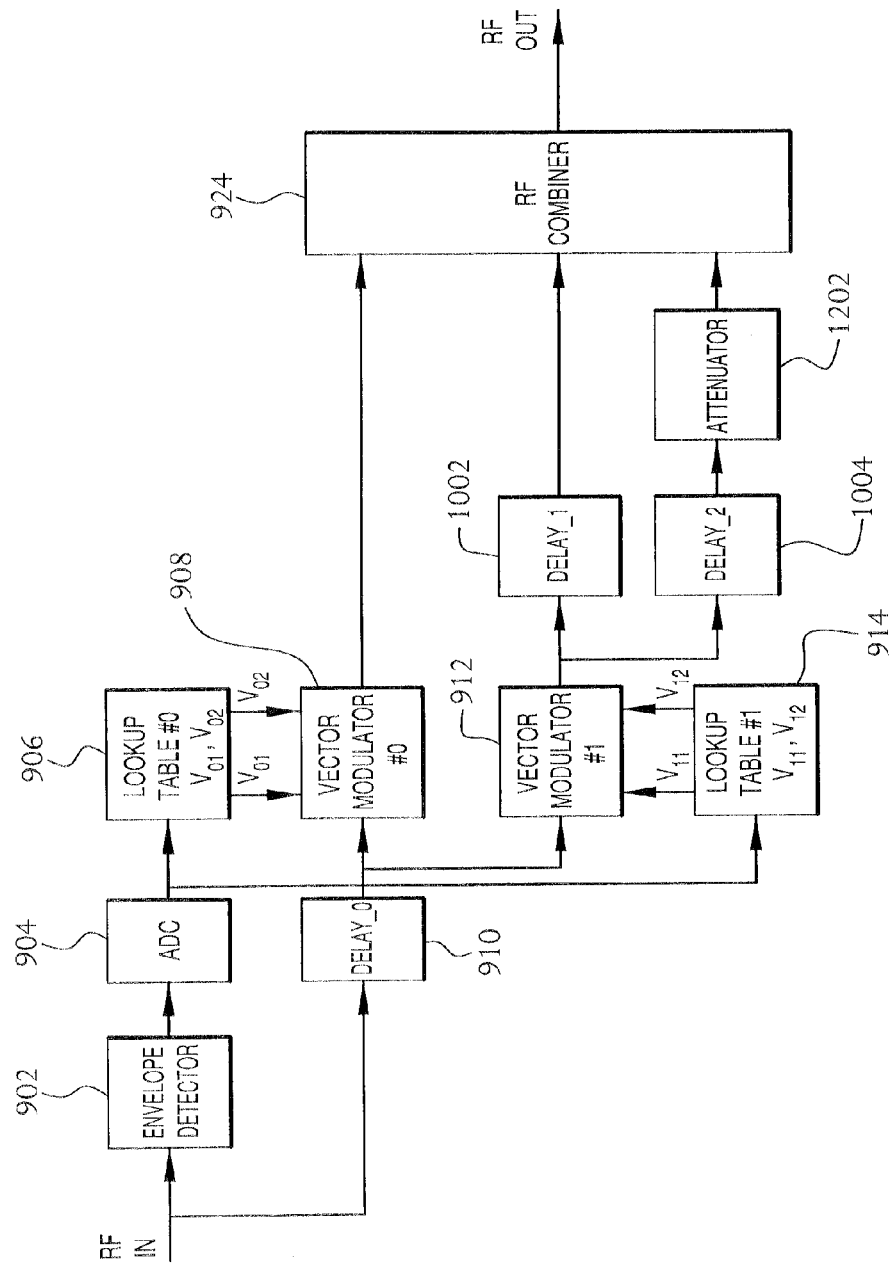

In some cases, it is found that the contents of look-up table 918 can be approximated by the contents of look-up table 914, multiplied by a constant. In such cases, the RF implementations of FIGS. 9 and 10 can be simplified as shown in FIGS. 11 and 12. According to these implementations, vector modulator 916 and its associated look-up table 918 may be eliminated, with the output of vector modulator 912 being split into two paths, one of which is attenuated relative to the other by an attenuator (1102 in FIGS. 11 and 1202 in FIG. 12). In FIGS. 11 and 12, the attenuator is placed in the paths shown when the value of the constant relating the values in look-up table 918 to the values in look-up table 914 of FIGS. 9 and 10 is less than one. When the value of the constant is greater than one, an attenuator is preferably placed in the other path. As with FIGS. 9 and 10, the two configurations shown in FIGS. 11 and 12 produce similar results when the pre-distortion parameters in look-up table 914 of one configuration have the opposite sign as the pre-distortion parameters in the corresponding look-up table of the other configuration.

Alternative Embodiments

Depending on the particular application, the configurations shown in FIGS. 5-12 can be implemented in the context of circuitry that includes modules analogous to equalization filter 20, clipping module 22, low-pass filter 24, and sampling module 26 of FIG. 2. In alternative implementations of the present invention, one or more—and even all—of these components may be omitted and/or one or more other processing components may be included, depending on the characteristics of the input signals and the requirements of the particular communication network.

Although the present invention has been described in the context of configurations in which frequency-dependent phase pre-distortion of the present invention is combined with the (frequency-independent) magnitude and phase pre-distortion of the '490 application, the present invention is not so limited. In particular, it is possible to perform frequency-dependent phase pre-distortion of the present invention without performing the pre-distortion of the '490 application. In that case, the configuration shown in FIG. 5, for example, could be modified by omitting look-up table 30 and output module 36 and passing a copy of the delayed input signal from delay block 34 directly to delay block 506, while retaining the processing of look-up table 502 and module 504.

Although the present invention has been described in the context of wireless signals transmitted from a base station to one or more mobile units of a wireless communication network, the present invention is not so limited. In theory, embodiments of the present invention could be implemented for wireless signals transmitted from a mobile unit to one or more base stations. The present invention can also be implemented in the context of other wireless and even wired communication networks to reduce spurious emissions.

Embodiments of the present invention may be implemented as circuit-based processes, including possible implementation on a single integrated circuit. As would be apparent to one skilled in the art, various functions of circuit elements may also be implemented as processing steps in a software program. Such software may be employed in, for example, a digital signal processor, micro-controller, or general-purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the scope of the invention as expressed in the following claims.

What is claimed is:

1. A method for reducing spurious emissions in an amplified signal, comprising the steps of:
   (a) receiving an input signal; and
   (b) applying frequency-dependent phase pre-distortion to the input signal to generate a pre-distorted output signal, wherein the frequency-dependent phase pre-distortion is based on at least one corresponding phase difference between at least one pair of critical frequencies, such that, when the pre-distorted output signal is applied to an amplifier to generate the amplified signal, the frequency-dependent phase pre-distortion reduces spurious emissions in the amplified signal, wherein step (b) comprises the steps of:
   (1) generating a main output signal from the input signal;
   (2) generating one or more frequency-dependent phase pre-distortion signals from the input signal; and
   (3) advancing or delaying each frequency-dependent phase pre-distortion signal relative to the main output signal; and
   (4) combining each advanced or delayed frequency-dependent phase pre-distortion signal with the main output signal to generate the pre-distorted output signal.

2. The invention of claim 1, wherein step (b)(1) comprises the step of applying frequency-independent magnitude and phase pre-distortion to the input signal to generate the main output signal.

3. The invention of claim 1, wherein each frequency-dependent phase pre-distortion signal is based on a corresponding phase difference between a pair of critical frequencies.

4. The invention of claim 3, wherein step (b)(3) comprises the step of advancing or delaying each frequency-dependent phase pre-distortion signal relative to the main output signal based on the frequency difference between the corresponding pair of critical frequencies.

5. The invention of claim 3, wherein step (b)(2) comprises the step of generating two or more different frequency-dependent phase pre-distortion signals from the input signal based on two or more different pairs of critical frequencies.

6. The invention of claim 1, wherein the input signal is a baseband signal and the frequency-dependent phase pre-distortion is applied in the baseband domain.

7. The invention of claim 1, wherein the input signal is an RF signal and the frequency-dependent phase pre-distortion is applied in the RF domain.

8. The invention of claim 1, wherein the frequency-dependent phase pre-distortion is based on data retrieved from one or more look-up tables.

9. The invention of claim 8, wherein the one or more look-up tables are adaptively updated according to control signals generated based on the amplified signal.

10. The invention of claim 1, wherein:
   step (b) comprises the steps of:
   (1) applying frequency-independent magnitude and phase pre-distortion to the input signal to generate a main output signal;
   (2) generating one or more frequency-dependent phase pre-distortion signals from the input signal, wherein each frequency-dependent phase pre-distortion signal is advanced or delayed relative to the main output signal based on the frequency difference between the corresponding pair of critical frequencies; and
   (3) advancing or delaying each frequency-dependent phase pre-distortion signal relative to the main output signal; and
   (4) combining each advanced or delayed frequency-dependent phase pre-distortion signal with the main output signal to generate the pre-distorted output signal;
   each frequency-dependent phase pre-distortion signal is based on a corresponding phase difference between a pair of critical frequencies;

the frequency-dependent phase pre-distortion is based on data retrieved from one or more look-up tables, wherein the one or more look-up tables are adaptively updated according to control signals generated based on the amplified signal.

11. The invention of claim 10, wherein step (b)(2) comprises the step of generating two or more different frequency-dependent phase pre-distortion signals from the input signal based on two or more different pairs of critical frequencies.

12. The invention of claim 10, wherein the input signal is a baseband signal and the frequency-dependent phase pre-distortion is applied in the baseband domain.

13. The invention of claim 10, wherein the input signal is an RF signal and the frequency-dependent phase pre-distortion is applied in the RF domain.

14. An apparatus for reducing spurious emissions in an amplified signal, wherein the apparatus is configured to:
 (a) receive an input signal; and
 (b) apply frequency-dependent phase pre-distortion to the input signal to generate a pre-distorted output signal, wherein the frequency-dependent phase pre-distortion is based on at least one corresponding phase difference between at least one pair of critical frequencies, such that, when the pre-distorted output signal is applied to an amplifier to generate the amplified signal, the frequency-dependent phase pre-distortion reduces spurious emissions in the amplified signal, wherein the apparatus comprises:
  a main signal processing path configured to generate a main output signal from the input signal;
  one or more frequency-dependent phase pre-distortion paths configured to generate one or more frequency-dependent phase pre-distortion signals from the input signal;
  one or more delay blocks configured to advance or delay each frequency-dependent phase pre-distortion signal relative to the main output signal; and
  a combiner configured to combine each advanced or delayed frequency-dependent phase pre-distortion signal with the main output signal to generate the pre-distorted output signal.

15. The invention of claim 14, wherein the main signal processing path is configured to apply frequency-independent magnitude and phase pre-distortion to the input signal to generate the main output signal.

16. The invention of claim 14, wherein each frequency-dependent phase pre-distortion signal is based on a corresponding phase difference between a pair of critical frequencies.

17. The invention of claim 16, wherein the one or more delay blocks advance or delay each frequency-dependent phase pre-distortion signal relative to the main output signal based on the frequency difference between the corresponding pair of critical frequencies.

18. The invention of claim 16, comprising two or more frequency-dependent phase pre-distortion paths configured to generate two or more different frequency-dependent phase pre-distortion signals from the input signal based on two or more different pairs of critical frequencies.

19. The invention of claim 14, wherein the input signal is a baseband signal and the apparatus applies the frequency-dependent phase pre-distortion in the baseband domain.

20. The invention of claim 14, wherein the input signal is an RF signal and the apparatus applies the frequency-dependent phase pre-distortion in the RF domain.

21. The invention of claim 14, wherein the apparatus retrieves data for the frequency-dependent phase pre-distortion from one or more look-up tables.

22. The invention of claim 21, wherein the apparatus adaptively updates the one or more look-up tables according to control signals generated based on the amplified signal.

23. A machine-readable medium, having encoded thereon program code, wherein, when the program code is executed by a machine, the machine implements a method for reducing spurious emissions in an amplified signal, comprising the steps of:
 (a) receiving an input signal; and
 (b) applying frequency-dependent phase pre-distortion to the input signal to generate a pre-distorted output signal, wherein the frequency-dependent phase pre-distortion is based on at least one corresponding phase difference between at least one pair of critical frequencies, such that, when the pre-distorted output signal is applied to an amplifier to generate the amplified signal, the frequency-dependent phase pre-distortion reduces spurious emissions in the amplified signal.

24. A method for reducing spurious emissions in an amplified signal, comprising the steps of:
 (a) receiving an input signal; and
 (b) applying frequency-dependent phase pre-distortion to the input signal to generate a pre-distorted output signal, such that, when the pre-distorted output signal is applied to an amplifier to generate the amplified signal, the frequency-dependent phase pre-distortion reduces spurious emissions in the amplified signal, wherein step (b) comprises the steps of:
  (1) applying frequency-independent magnitude and phase pre-distortion to the input signal to generate a main output signal;
  (2) generating one or more frequency-dependent phase pre-distortion signals from the input signal; and
  (3) advancing or delaying each frequency-dependent phase pre-distortion signal relative to the main output signal; and
  (4) combining each advanced or delayed frequency-dependent phase pre-distortion signal with the main output signal to generate the pre-distorted output signal.

25. The invention of claim 24, wherein step (b)(2) comprises generating two or more frequency-dependent phase pre-distortion signals from the input signal.

26. An apparatus for reducing spurious emissions in an amplified signal, wherein the apparatus comprises:
 (a) a main signal processing path configured to apply frequency-independent magnitude and phase pre-distortion to the input signal to generate a main output signal;
 (b) one or more frequency-dependent phase pre-distortion paths configured to generate one or more frequency-dependent phase pre-distortion signals from the input signal;
 (c) one or more delay blocks configured to advance or delay each frequency-dependent phase pre-distortion signal relative to the main output signal; and
 (d) a combiner configured to combine each advanced or delayed frequency-dependent phase pre-distortion signal with the main output signal to generate a pre-distorted output signal, such that, when the pre-distorted output signal is applied to an amplifier to generate the amplified signal, the frequency-dependent phase pre-distortion reduces spurious emissions in the amplified signal.

27. The invention of claim 26, wherein the apparatus comprises:
- two or more frequency-dependent phase pre-distortion paths configured to generate two or more frequency-dependent phase pre-distortion signals from the input signal; and
- two or more delay blocks configured to advance or delay each frequency-dependent phase pre-distortion signal relative to the main output signal.

28. A method for reducing spurious emissions in an amplified signal, comprising the steps of:
- (a) receiving an input signal; and
- (b) applying frequency-dependent phase pre-distortion to the input signal to generate a pre-distorted output signal, wherein:
  - the frequency-dependent phase pre-distortion is based on at least one corresponding phase difference between at least one pair of critical frequencies, such that, when the pre-distorted output signal is applied to an amplifier to generate the amplified signal, the frequency-dependent phase pre-distortion reduces spurious emissions in the amplified signal; and
  - the frequency-dependent phase pre-distortion is based on data retrieved from one or more look-up tables.

29. The invention of claim 28; wherein the one or more look-up tables are adaptively updated according to control signals generated based on the amplified signal.

30. An apparatus for reducing spurious emissions in an amplified signal, wherein the apparatus is configured to:
- (a) receive an input signal; and
- (b) apply frequency-dependent phase pre-distortion to the input signal to generate a pre-distorted output signal, wherein:
  - the frequency-dependent phase pre-distortion is based on at least one corresponding phase difference between at least one pair of critical frequencies, such that, when the pre-distorted output signal is applied to an amplifier to generate the amplified signal, the frequency-dependent phase pre-distortion reduces spurious emissions in the amplified signal; and
  - the apparatus retrieves data for the frequency-dependent phase pre-distortion from one or more look-up tables.

31. The invention of claim 30, wherein the apparatus adaptively updates the one or more look-up tables according to control signals generated based on the amplified signal.

* * * * *